United States Patent
Bolle et al.

(10) Patent No.: US 8,538,096 B2
(45) Date of Patent: Sep. 17, 2013

(54) METHODS AND APPARATUS FOR GENERATION OF CANCELABLE FINGERPRINT TEMPLATE

(75) Inventors: Rudolf Maarten Bolle, Bedford Hills, NY (US); Sharat S. Chikkerur, Cambridge, MA (US); Jonathan Hudson Connell, Cortlandt Manor, NY (US); Nalini Kanta Ratha, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1653 days.

(21) Appl. No.: 11/971,634

(22) Filed: Jan. 9, 2008

(65) Prior Publication Data
US 2009/0175513 A1 Jul. 9, 2009

(51) Int. Cl.
*G06K 9/00* (2006.01)
(52) U.S. Cl.
USPC ............. 382/124; 340/5.52; 382/218; 705/64
(58) Field of Classification Search
USPC ............... 382/124, 125, 218; 340/5.52, 5.53; 705/64
See application file for complete search history.

(56) References Cited

U.S. PATENT DOCUMENTS

| 5,003,166 | A | 3/1991 | Girod | |
|---|---|---|---|---|
| 6,836,554 | B1 | 12/2004 | Bolle et al. | |
| 7,120,607 | B2 * | 10/2006 | Bolle et al. | 705/64 |
| 2003/0026588 | A1 | 2/2003 | Elder et al. | |
| 2004/0179719 | A1 | 9/2004 | Chen et al. | |
| 2005/0286767 | A1 | 12/2005 | Hager et al. | |
| 2006/0050933 | A1 | 3/2006 | Adam et al. | |
| 2006/0285770 | A1 | 12/2006 | Lim et al. | |
| 2008/0298642 | A1* | 12/2008 | Meenen | 382/115 |
| 2009/0175513 | A1* | 7/2009 | Bolle et al. | 382/125 |

FOREIGN PATENT DOCUMENTS

WO WO2006061365 6/2006

\* cited by examiner

*Primary Examiner* — Gregory M Desire
(74) *Attorney, Agent, or Firm* — Eustus D. Nelson; Ryan, Mason & Lewis, LLP

(57) ABSTRACT

Techniques for generating a distorted fingerprint representation for a given fingerprint image are provided. First, at least one fingerprint feature point from a given fingerprint image is selected. At least one representation of a region proximate to the selected fingerprint feature point is then generated. Next, the representation of the region proximate to the selected fingerprint feature point is distorted. The distortion comprises applying a random projection to the representation to generate a randomly projected representation of the region proximate to the selected fingerprint feature point. A distorted template is then formed, wherein the distorted template comprises the randomly projected representation of the region proximate to the selected fingerprint feature point.

17 Claims, 9 Drawing Sheets

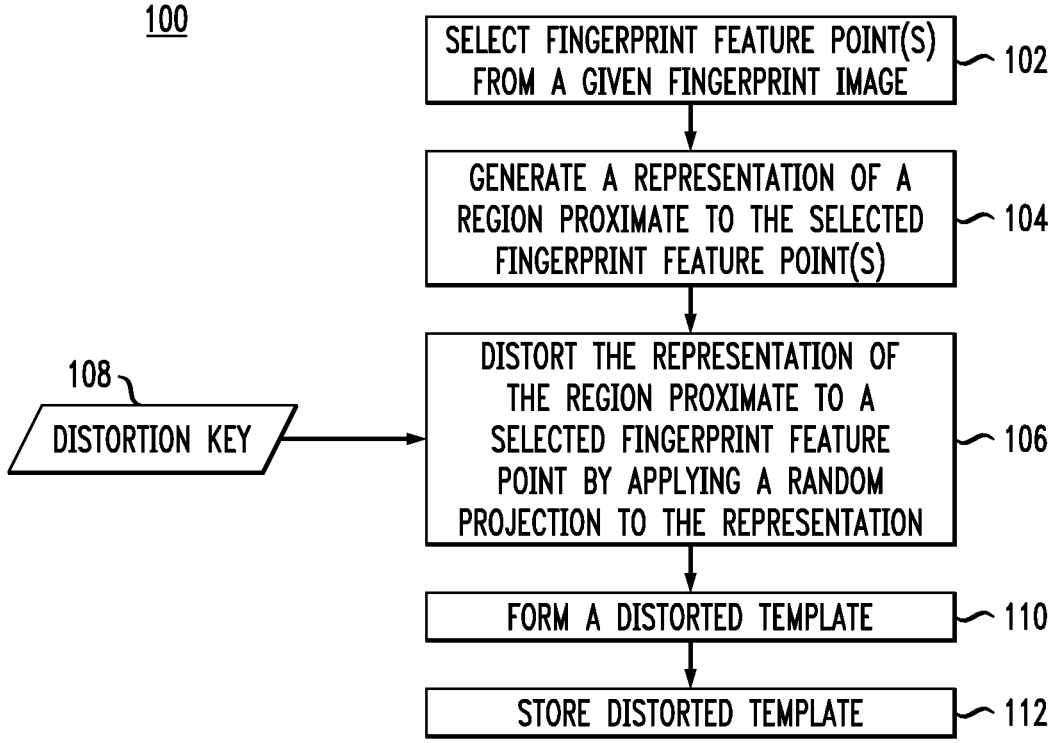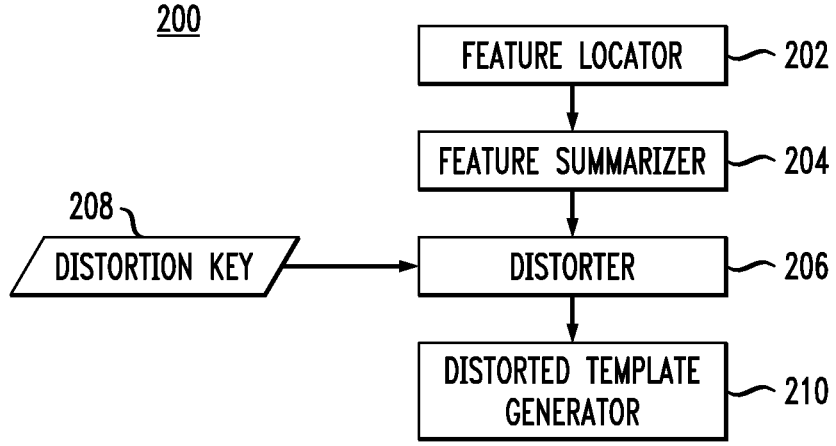

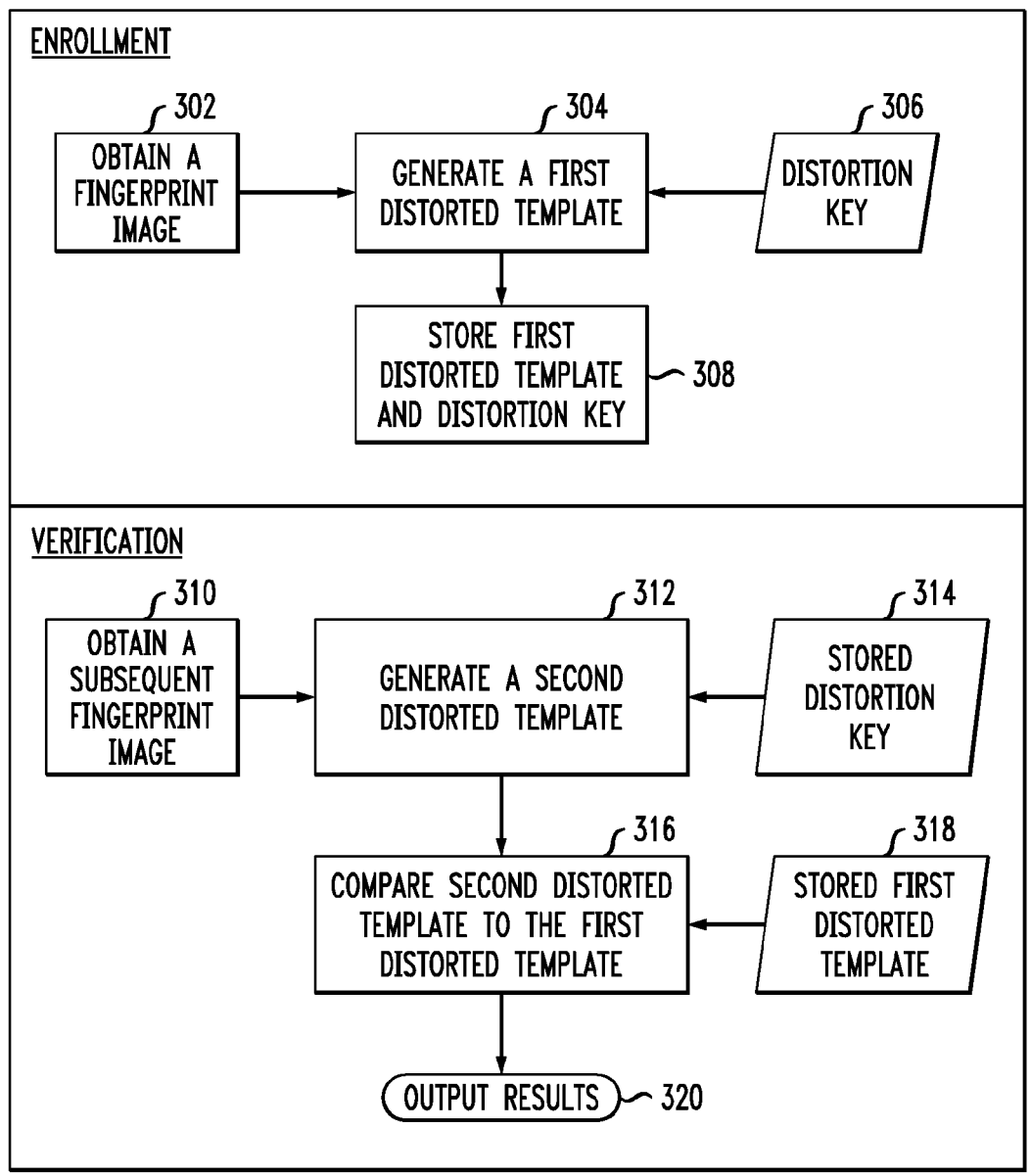

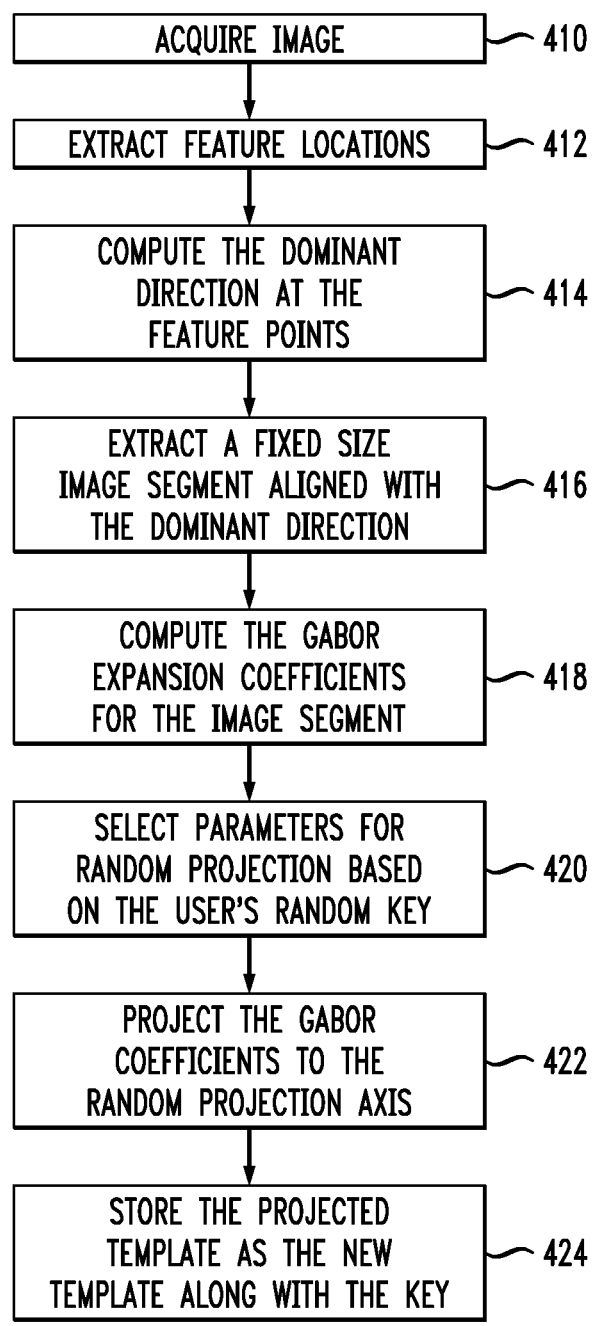

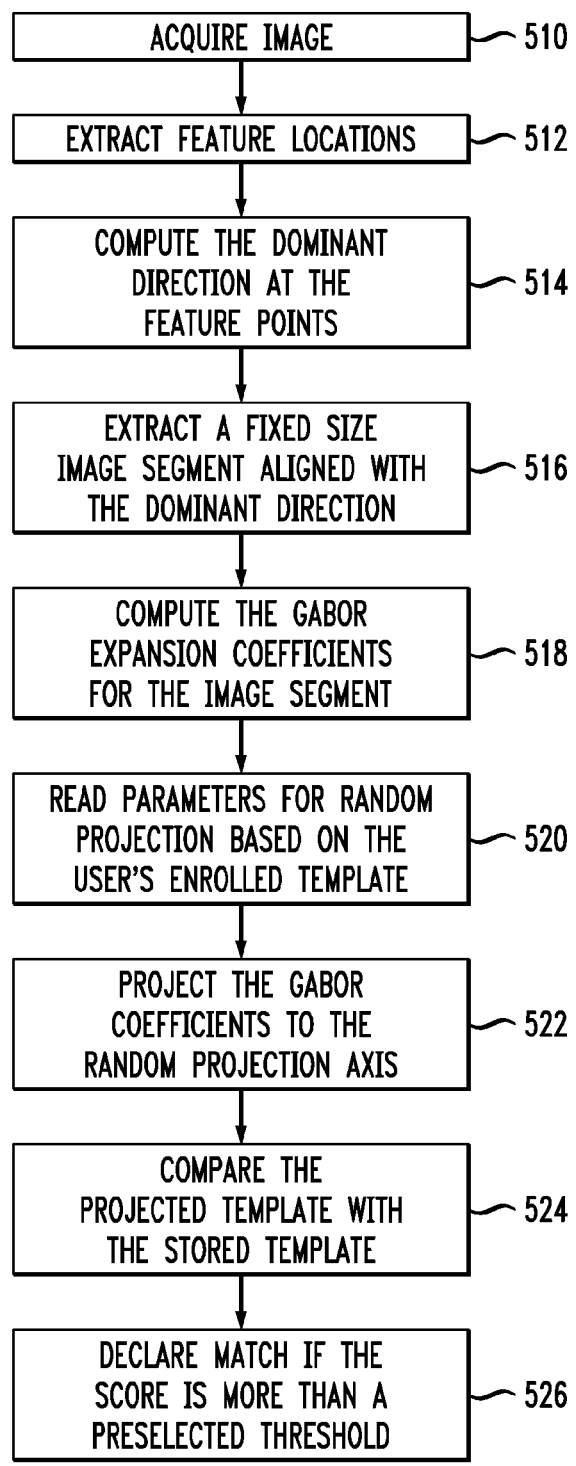

1000

METHODS AND APPARATUS FOR GENERATION OF CANCELABLE FINGERPRINT TEMPLATE

FIELD OF THE INVENTION

The present invention generally relates to fingerprint image processing systems and, more particularly, to techniques for generating cancelable fingerprint templates which can be used for identification purposes in such fingerprint image processing systems.

BACKGROUND OF THE INVENTION

Identification using biometrics has become an increasingly popular form of user verification. A "biometric" is generally understood to refer to one or more intrinsic physical traits or characteristics associated with an individual (e.g., facial features, fingerprint, etc.). The increase in popularity of such a verification approach is due to the inherent advantages of biometric data. First, it is convenient for individuals and institutions because an individual no longer needs to remember passwords and/or carry unique identifiers such as photo identification cards. Biometrics are compact and individuals can easily carry their identity with them at all times. Another key advantage of using biometrics is security.

At first glance, biometric data is incredibly secure because, theoretically, no two individuals possess the same biometric signature. However, although biometric identification is undoubtedly unique and simple to use, the biometrics of an individual can also be easily compromised. Biometric forgery can be as simple as hacking into an accounts database and copying the biometric signatures of individuals. Furthermore, after obtaining a biometric signature, a forger can easily infiltrate any account secured by the biometric (e.g., banks, computers, buildings, etc.).

Many existing techniques do not address biometric theft since many assume that the uniqueness of biometric signatures alone provides sufficient security. However, as a practical issue, after the biometric of an individual has been stolen, the individual can not simply cancel the stolen biometric and establish a new one. There have been attempts to create distorted versions of a biometric for identification purposes, however, these methods can be limited. For example, some existing techniques utilize a method of distorting biometrics by warping the entire biometric. Other existing techniques utilize a method of distorting biometrics by breaking the biometric up into blocks and scrambling the blocks of the biometric.

These existing distortion approaches result in a biometric form that can not be used on current biometric scanners because the biometric no longer resembles the scanned body part. Further, the distorted biometric is so obviously altered that a biometric forger may make attempts to reverse engineer the original biometric. This is feasible since existing systems create distorted biometric forms that can revert to the original biometric. Therefore, if a forger knows that a biometric has been distorted and knows how the biometric was distorted, the forger can undo the distortion.

Additional limitations are specifically inherent in fingerprint biometrics. Since fingerprints are composed of random patterns of ridges and valleys, an effective method of consistently recreating unique, distorted fingerprint biometrics is currently unavailable. For example, existing techniques require the specific alignment of a fingerprint before a distortion can be made. Therefore, a fingerprint to be verified must be scanned in a similar (if not, the exact same) manner as the original biometric was scanned in order to recreate the same distortion. If a distortion can not be consistently recreated, identification of an individual using a distorted fingerprint image would be error prone and impractical.

Therefore, there is a need for generating distorted fingerprint biometrics that: (1) are unique; (2) can not be used to reform the original biometric ("non-invertible"); (3) appear authentic; (4) can be consistently recreated; and (5) can be easily canceled and replaced whenever the security or privacy of an individual has been compromised.

SUMMARY OF THE INVENTION

Principles of the present invention provide techniques that overcome the above-mentioned drawbacks associated with existing methods by providing techniques that address the above needs, as well as other needs. More particularly, principles of the invention provide techniques for generating a distorted template for a given fingerprint image. The distorted template may also be referred to as a distorted fingerprint representation or a cancelable fingerprint template. Such distorted template can itself be used for identification purposes.

For example, in one aspect of the invention, a technique for generating a distorted fingerprint representation for a given fingerprint image comprises the following steps. At least one fingerprint feature point is selected from the given fingerprint image. At least one representation of a region proximate to the selected fingerprint feature point is generated. The representation of the region proximate to the selected fingerprint feature point is distorted. Distorting the representation comprises applying a random projection to the representation to generate a randomly projected representation of the region proximate to the selected fingerprint feature point. A distorted fingerprint representation is formed comprising the randomly projected representation of the region proximate to the selected fingerprint feature point. At least one fingerprint feature point may be a minutia comprising a ridge ending and/or a bifurcation.

The step of generating the representation of a region proximate to the selected fingerprint feature point may further comprise generating a set of transform coefficients representative of the region proximate to the selected fingerprint feature point. The set of transform coefficients may further comprise a set of Gabor expansion coefficients.

The distortion step may be performed in accordance with a distortion key. The distortion key may comprise a projection matrix and the projection matrix may comprise random orthonormal axes. Further, the step of applying a random projection to the representation to generate a randomly projected representation of the region proximate to the selected fingerprint feature point may further comprise randomly projecting at least a portion of the set of transform coefficients. Still further, the distance between a representation of the region proximate to the selected feature point and a representation of a region proximate to another feature point is maintained after the random projection.

The above technique may further comprise the step of computing a dominant direction associated with the region proximate to the selected fingerprint feature point. If so, the representation of said region is aligned to the computed dominant direction. Thus, this step accounts for rotation compensation.

In addition, the distorted fingerprint representation is preferably non-invertible and is preferably in the form of a template. Further, the distorted fingerprint representation may subsequently be useable for an identity verification operation.

In a second aspect of the invention, an article of manufacture for generating a distorted fingerprint representation for a given fingerprint image comprises a computer readable storage medium containing one or more programs which when executed by a computer implement the above steps.

In a third aspect of the invention, a system for generating a distorted fingerprint representation for a given fingerprint image is provided. The system comprises a feature locator for selecting at least one fingerprint feature point from the given fingerprint image. The system further comprises a feature summarizer for generating at least one representation of a region proximate to the selected fingerprint feature point. Further, the system comprises a distorter for distorting the representation of the region proximate to the selected fingerprint feature point, wherein distorting the representation comprises applying a random projection to the representation to generate a randomly projected representation of the region proximate to the selected fingerprint feature point. Also, the system comprises a distorted fingerprint representation generator for forming a distorted fingerprint representation comprising the distorted representation of the region proximate to the selected fingerprint feature point.

In a fourth aspect of the invention, an apparatus for generating a distorted fingerprint representation for a given fingerprint image comprises: a memory; and at least one processor coupled to the memory and operative to: (i) select at least one fingerprint feature point from the given fingerprint image; (ii) generate at least one representation of a region proximate to the selected fingerprint feature point; (iii) distort the representation of the region proximate to the selected fingerprint feature point, wherein distorting the representation comprises applying a random projection to the representation to generate a randomly projected representation of the region proximate to the selected fingerprint feature point; and (iv) form a distorted fingerprint representation comprising randomly projected representation of the region proximate to the selected fingerprint feature point.

These and other objects, features, and advantages of the present invention will become apparent from the following detailed description of illustrative embodiments thereof, which is to be read in connection with the accompanying drawings.

BRIEF DESCRIPTION OF THE DRAWINGS

FIG. 1 is a flow diagram illustrating a methodology for generating a distorted template for a given fingerprint image, according to an embodiment of the present invention.

FIG. 2 is a flow diagram illustrating a system for generating a distorted template for a given fingerprint image, according to an embodiment of the present invention.

FIG. 3 is a flow diagram illustrating a methodology for enrollment and verification of a fingerprint image, according to an embodiment of the present invention.

FIG. 4 is a flow diagram illustrating a methodology for enrolling a fingerprint image, according to another embodiment of the present invention.

FIG. 5 is a flow diagram illustrating a methodology for verifying a fingerprint image, according to another embodiment of the present invention.

DETAILED DESCRIPTION OF PREFERRED EMBODIMENTS

Figure 6:
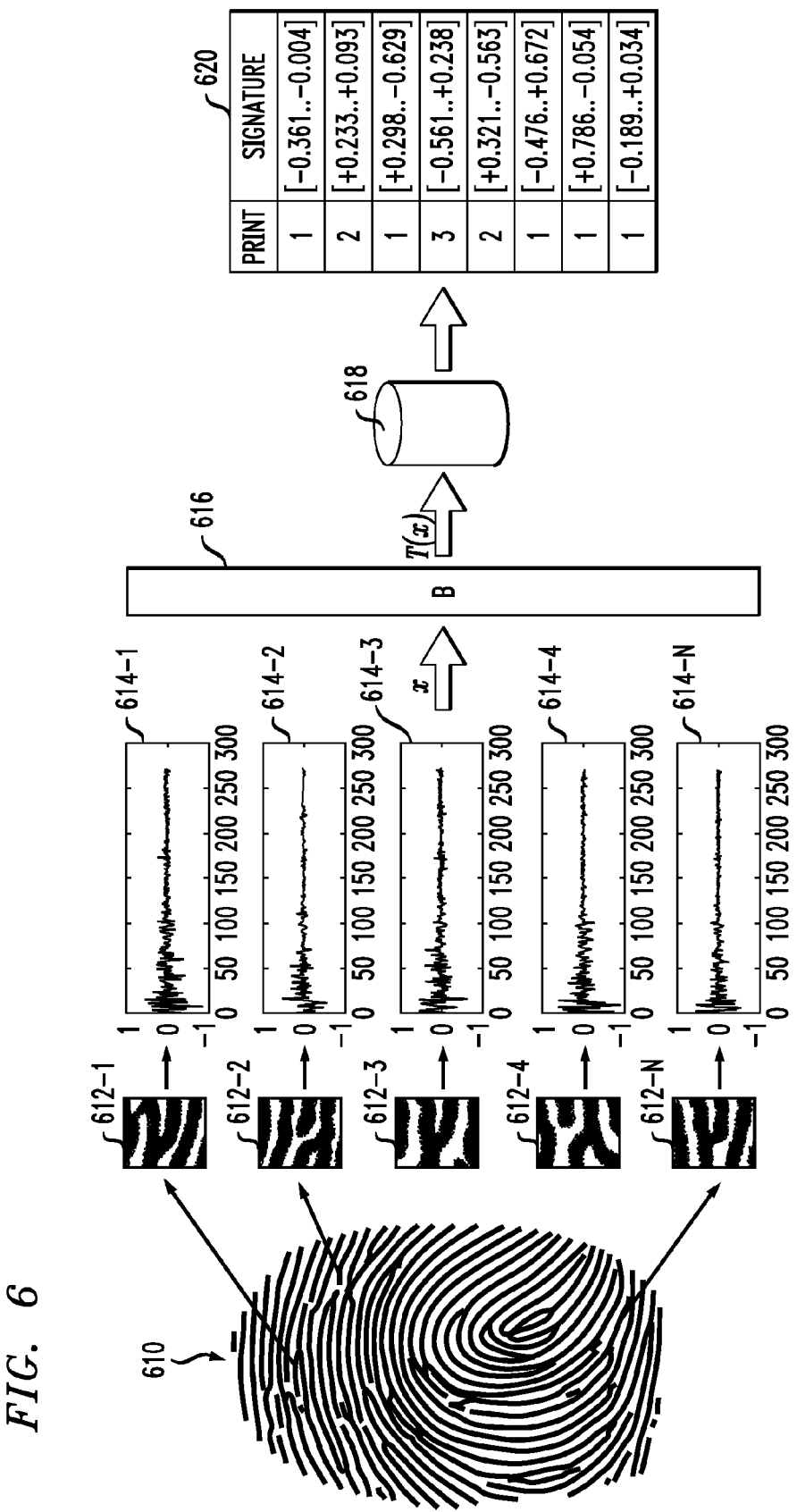
FIG. 6 is a diagram illustrating the methodology of FIG. 4 as applied to a given example, according to an embodiment of the present invention.

Illustrative embodiments of the invention will be described below in the context of Gabor expansion coefficients. However, it is to be appreciated that the principles of the invention are not limited to discrete wavelet transforms that are represented as Gabor expansion coefficients, but rather or more generally applicable to any suitable transformation that can be employed to represent a patch representation associated with a feature point in a fingerprint image.

The term "cancelable" as used herein is intended to be construed broadly so as to encompass, by way of example and without limitation, anything that can be deleted and replaced.

The term "distorted template" as used herein is intended to be construed broadly so as to encompass, by way of example and without limitation, a set of values that represent a distortion. A distorted template may also be referred to herein as a "distorted fingerprint representation" or a "cancelable fingerprint template."

The term "distorted subset" as used herein is intended to be construed broadly so as to encompass, by way of example and without limitation, a set of values altered from their original values by a distortion, wherein the distorted subset may comprise at least a part of the distorted template.

The term "distortion key" as used herein is intended to be construed broadly so as to encompass, by way of example and without limitation, a definition of the particular distortion transform that is applied to generate the distorted template.

The term "non-invertible" as used herein is intended to be construed broadly so as to encompass, by way of example and without limitation, anything incapable of being changed to (reverted to) its original form.

The term "orthonormal axes" as used herein is intended to be construed broadly so as to encompass, by way of example and without limitation, two or more axes that are perpendicular to each other.

The term "patch" as used herein is intended to be construed broadly so as to encompass, by way of example and without limitation, a smaller region of a larger area.

Referring initially to FIG. 1, a flow diagram illustrates methodology 100 for generating a distorted template for a given fingerprint image, according to an embodiment of the present invention.

First, one or more points associated with a fingerprint feature of a given fingerprint image are selected (step 102). It is to be understood that more than one fingerprint feature may be selected and processed in accordance with methodology 100. After locating the one or more selected fingerprint feature points, a representation of a region proximate (i.e., near) to each selected fingerprint feature point is generated (step 104). This region may be referred to as a patch.

After locating fingerprint feature points and generating patch representations, the patches are distorted (step 106). The distortion is carried out by applying random projections to the patches, which results in the generation of randomly projected patches. The distortion is defined by a distortion key 108. The distortion key represents a definition of the particular distortion transform that is applied to generate the distorted template. Such a distortion transform may be predetermined by a system designer or adapted in real-time by a system administrator.

In one embodiment, the distortion key comprises a projection matrix. In an additional embodiment, the projection matrix is in the form of random orthonormal axes. The random orthonormal axes are axes that comprise random points of origin and random angles. These axes may be used to generate distorted patch projections. A more detailed description of this distortion is provided below in the context of FIG. 8.

After the distortion process completes, a distorted template is formed (step 110). The distorted template comprises the distorted patch representations for each selected fingerprint feature point. The newly formed distorted template is then stored (step 112).

The distorted fingerprint template may be stored together with the distortion key or separately. This depends on the security preferences of an individual or institution. For example, when a customer creates a bank account, the bank may store a distorted fingerprint template of a customer in their bank accounts database, while the customer carries the distortion key on a bank issued banking card. Anytime the customer seeks access to his bank account, the customer scans his fingerprint at a bank terminal and presents the banking card containing the distortion key. For verification purposes, the newly scanned fingerprint is processed and distorted with the distortion key and a subsequent distorted template is generated. The subsequent distorted template is then compared to the distorted template stored in the bank accounts database. In the alternative, the bank may want to store the distorted template with the distortion key. In this case, the customer only scans his fingerprint for access verification.

Note that, in one embodiment, the distorted template can be comprised only of the set of distorted data (i.e., distorted subset) that represents the distorted patch representations. However, since the distorted template would therefore not contain much information that is unique to the individual whose fingerprint image is being distorted, in a preferred embodiment, the distorted template comprises the set of distorted data and a set of undistorted data that represents patch representations of a given fingerprint image that have not been altered via methodology 100. Thus, in such a preferred embodiment, the template includes every fingerprint feature point (distorted or not) used to define a fingerprint image. In general, approximately twenty to fifty feature points can be used to define a fingerprint image. Of course, the number of fingerprint feature points depends on the fingerprint recognition system being employed.

Thus, one could refer to an "original template" as a template that includes every fingerprint feature point used to define a fingerprint image, before application of methodology 100. Thus, given an original template, methodology 100 generates a distorted template.

At the end of the methodology, the distorted template can be used directly for matching as it still retains most of the distinctiveness of the original representation.

Referring now to FIG. 2, a flow diagram illustrates a system for generating a distorted template for a given fingerprint image, according to an embodiment of the present invention. The components of system 200 carry out the methods illustrated in FIG. 1. System 200 begins at feature locator 202. The feature locator carries out step 102 of FIG. 1. At least one fingerprint feature point from a given fingerprint image is selected. Next, the feature summarizer 204 carries out step 104 of FIG. 1. For each selected fingerprint feature point, the feature summarizer generates patch representations of the regions surrounding each corresponding fingerprint feature point.

After summarizing the feature points, distorter 206 carries out step 106 of FIG. 1. In an illustrative embodiment, the distorter, using a distortion key 208, distorts the patch representations. After the distortion, the distorted template generator 210 carries out steps 110 and 112 of FIG. 1. The distorted template generator forms a distorted template comprising the distorted patch representations.

Referring now to FIG. 3, a flow diagram illustrates a methodology for enrollment and verification of a fingerprint image, according to an embodiment of the present invention. Methodology 300 exemplifies a two step process which includes an enrollment step and a verification step. Each step separately applies the methodology of FIG. 1. The methodology begins in block 302 where a fingerprint image is obtained for enrollment purposes. For example, a bank may enroll the fingerprints of its customers for accounts access or an office building may enroll the fingerprints of its employees for building access, etc. The obtained fingerprint image is used to generate a first distorted template 304.

In an illustrative embodiment, the generation of a first distorted template requires the use of a distortion key 306, which comprises a projection matrix. The projection matrix is used to transform the Gabor coefficients that constitute the patch representations (original template). The generated distorted template is a unique product of the original template and distortion key. Multiple distortions of the original template will never be the same as long as different distortion keys are used for each distortion.

After generating a first distorted template, the first distorted template and distortion key are stored 308. The first distorted template and the distortion key may be stored together or separately for security purposes. For instance, an individual may want to carry the distortion key on a magnetic card or other device to prevent simultaneous theft of both the distorted template and the distortion key. However, this is unnecessary in many, if not all, cases because the generated distorted template is non-invertible. Therefore, the original fingerprint image can not be reverse engineered with the distorted template and distortion key.

After the enrollment of a fingerprint image, the first distorted template is used for future verifications of identity. The verification methodology begins at block 310 where a subsequent fingerprint image is obtained. Selected patch representations (Gabor coefficients) of the subsequent fingerprint image are distorted to generate a second distorted template 312. The stored distortion key 314, used to create the first distorted template, is used to generate the second distorted template. The same distortion key must be used for both enrollment and verification to ensure an identical distortion. After the second distorted template is generated, the second distorted template is compared 316 to the first distorted template 318 generated in the enrollment process. The results of the comparison are then outputted 320.

In an illustrative embodiment, the comparison is made using various scoring methods which include, but are not limited to, a simple count, log weighting, inverse weighting, and match scoring. A more detailed description of scoring is provided in FIG. 7. If there is a substantial match, then system 300 indicates that the individual who provided the first fingerprint image is the same individual who provided the second fingerprint image (i.e., the individual that provided the second fingerprint image is verified).

Referring now to FIG. 4, a flow diagram illustrates a methodology for enrolling a fingerprint image, according to another embodiment of the present invention. Methodology 400 may be considered a more detailed description of the enrollment process of FIG. 3. The methodology begins at step 410 where a fingerprint image is acquired. At step 412, the fingerprint image is analyzed and feature points (or feature locations) are extracted. The extraction of feature points involves identifying minutia points of the fingerprint. Fingerprint minutiae contain ridge endings and/or bifurcations which are unique to an individual.

After extracting feature points, a dominant direction at the feature points is computed at step 414. Next, in step 416, fixed size image segments of the feature points are extracted and aligned with the computed dominant direction. This may be a vertical alignment or a horizontal alignment. The purpose of alignment is to create a uniform method of analysis. For example, conventional methods require that a fingerprint be scanned the same way every time. This is to ensure that the alignment of the fingerprint image is uniform for analysis. In an illustrative embodiment of the present invention, each extracted patch of the fingerprint image is aligned in the same direction; therefore, the concern of uniform scanning is not an issue.

At step 418, Gabor expansion coefficients for each image segment are computed:

$$I(x, y) = \sum_n a_n G_n(x, y).$$

Gabor expansion is used in to represent the local block around each minutiae I(x,y) compactly. Each 32×32 block is expressed as a linear combination of Gabor basis functions $G_n(x,y)$ with $a_n$ representing the mixing coefficients. The coefficients are designed to minimize reconstruction error.

Next, parameters for a random projection of the Gabor coefficients based on a distortion key (or random key) are selected at step 420. The Gabor coefficients of the patches are then transformed in accordance with the random projection parameters. The random projection parameters may comprise random projection axes. In this case, a distortion is generated by projecting the Gabor coefficients to the random projection axes (step 422). The distorted coefficients are stored as a distorted template. At step 424, the distorted template and distortion key are stored for subsequent verification purposes.

Referring now to FIG. 5, a flow diagram illustrates a methodology for verifying a fingerprint image, according to another embodiment of the present invention. Methodology 500 may be considered a more detailed description of the verification process of FIG. 3. The methodology begins at step 510 where a subsequent fingerprint image is acquired. At step 512, feature points of the subsequent fingerprint image are extracted. At step 514, a dominant direction at the feature points is computed. Next, at step 516, fixed size image segments of the feature points are extracted and aligned with the computed dominant direction. At step 518, the Gabor expansion coefficients for the image segments are computed.

In contrast to the enrollment process, random projection parameters are not selected in the verification process. Instead, at step 520, the parameters (i.e., distortion key) used during enrollment are obtained from storage. These parameters are then used to project the Gabor coefficients at step 522. The distorted Gabor coefficients are then stored as a template. At step 524, the distorted template of the subsequent fingerprint image is compared to the distorted template generated during enrollment. In an illustrative embodiment, the comparison is based on a scoring mechanism and a match is declared if the score meets a preselected threshold (step 526).

Referring now to FIG. 6, a diagram illustrates the methodology of FIG. 4 as applied to a given example, according to an embodiment of the present invention. A fingerprint image 610 is first obtained. Patches of the fingerprint image are extracted and aligned in a dominant direction (612-1, . . . 612-N). The Gabor expansion coefficients for each patch are then computed (614-1, . . . 614-N). This set of Gabor coefficients may be considered the original template. The coefficients are transformed 616 using random projections (transform B). The transformed coefficients are then stored (618) in a distorted template, which comprises the transformed patch data (620). A subset of coefficients can be selected either based on a random selection policy or on a preselected policy. The coefficients can also be quantized to make it difficult for full reconstruction of the patch.

Figure 7:
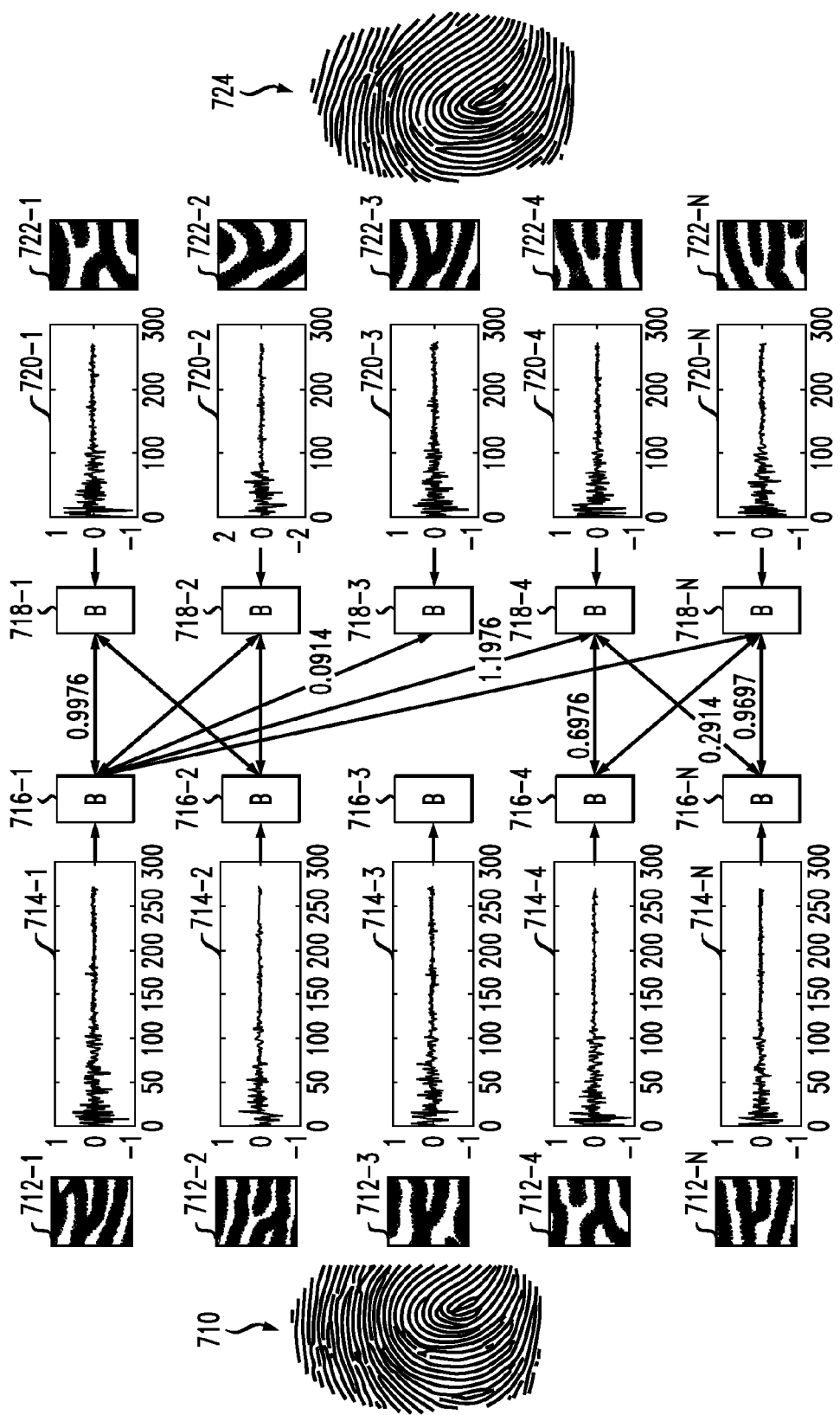
FIG. 7 is a diagram illustrating the methodology of FIG. 5 as applied to a given example, according to an embodiment of the present invention.

Referring now to FIG. 7, a diagram illustrates the methodology of FIG. 5 as applied to a given example, according to an embodiment of the present invention. In the verification methodology, two distorted fingerprint templates are generated and compared. First, a fingerprint image 710 is obtained at an enrollment time. Patches of the fingerprint image are extracted and aligned in a dominant direction (712-1, . . . 712-N). The Gabor expansion coefficients for each patch are then computed (714-1, . . . 714-N). The coefficients are transformed (716-1, . . . 716-N) using random projections (transform matrix B). The transform matrix B can be split into two part U and V such that $B=UV^T$. The user and the system can each keep a component of it so that the system is more secure. Each part (U or V) does not reveal anything about the other thus minimizing any loss of information if one of them is lost or compromised, while both will be needed to carry out a valid authentication.

A subsequent fingerprint 724 that is to be verified is obtained. Patches of the subsequent fingerprint image are extracted and aligned in a dominant direction (722-1, . . . 722-N). The Gabor expansion coefficients for each patch are then computed (720-1, . . . 720-N). The coefficients are transformed (718-1, . . . 718-N) using the same random projections (transform B) used to distort the Gabor coefficients of the first fingerprint image. The transformed coefficients of the enrolled fingerprint (716-1, . . . 716-N) are then compared to the transformed coefficients of the subsequent fingerprint (718-1, . . . 718-N) and the comparison is scored, some illustrative embodiments (e.g., match score, simple count, log weighting, inverse weighting) of which will be described below.

Figure 8:
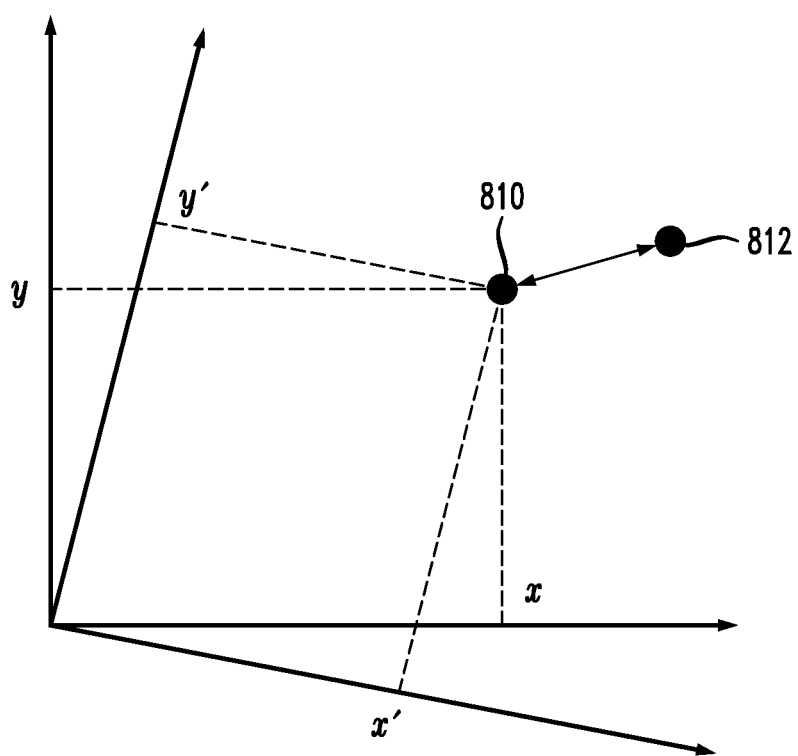
FIG. 8 is a diagram illustrating a random projection axis and the preservation of distance between two given feature points of a fingerprint image, according to an embodiment of the present invention.

Referring now to FIG. 8, a diagram illustrates a random projection axis and the preservation of distance between two given feature points of a fingerprint image, according to an embodiment of the present invention. Points 810 and 812 represent two feature points of a fingerprint image. In the distortion step, the feature points are re-plotted using a random projection. The coordinate system used to measure the feature points of the original fingerprint image are denoted by axis (x, y). A random projection axis (x', y') is used to distort the points. In this example, the random projection axis contains a different angle of projection with respect to the original axis (x, y). In an additional embodiment, the point of origin can also be changed. Each random projection provides a different measurement of the same feature point. Furthermore, regardless of how the points are projected, the distance between the projected points will be the same as the distance between the original feature points. The following equations illustrate projection:

$$d(x, y) = \frac{\langle x, y \rangle}{\sqrt{\langle x, x \rangle \langle y, y \rangle}} = \frac{x^T y}{\sqrt{(x^T x)(y^T y)}}$$

$$d(T(x), T(y)) = \frac{\langle B^T x, B^T y \rangle}{\sqrt{\langle B^T x, B^T x \rangle \langle B^T y, B^T y \rangle}} = \frac{x^T B B^T y}{\sqrt{(x^T B B^T x)(y^T B B^T y)}}$$

$$d(x, y) = d(T(x), T(y)), \text{ iff } B B^T = I.$$

In a slight simplification of notation, let us indicate the Gabor expansion coefficients obtained from the two blocks using vectors x and y. The normalized dot product similarity/distance measure between the two blocks is given by d(x,y) as shown above. The similarity is one if the blocks are identical and low (close to zero) otherwise. The transformed representation for each block, T(x) is obtained by projecting the vector x on to a user-specific basis B using T(x)=$B^T$x. The distance between the projected vectors d(T(x),T(y)) is identical to the original distance d(x,y) if the basis is orthonormal.

While the invention is not limited thereto, the following equations illustrate some illustrative methods of scoring:

$$\text{match score}(M, N) = \frac{\left(\sum_{x \in M} \text{score}(x, y)\right)^2}{|M| \times |N|}$$

M=set of probe patches, N set of gallery patches

In match score, where x is an element of M and y is an element of N, let the probe fingerprint contain M minutiae blocks and the gallery N such blocks. In order to compare the two fingerprints, we need to match each minutiae block (represented by the vector x) in the probe to the corresponding minutiae block in the gallery (represented by y) if it exists. This is achieved by locally pairing minutiae blocks that jointly optimize the global matching score function shown above. Here score(x,y) represents the distance/dissimilarity between the minutiae blocks represented by vectors x and y.

There are several alternative scoring functions that we can use as seen in the following. Each scoring functions is derived using the normalized dot product measure d(x,y) described above.

$$\text{Simple count score}(x, y) = \begin{cases} 0 & \text{if } d(x, y) > t(= 0.35) \\ 1 & \text{otherwise} \end{cases}$$

Simple count penalizes mismatches with a value one and does not penalize matches with a similarity above (t=0.35).

$$\text{Log weighting score}(x, y) = \begin{cases} -\log(d(x, y)) & \text{if } d(x, y) < t(= 0.5) \\ 0 & \text{otherwise} \end{cases}$$

The log weighting function penalizes mismatches proportional to the negative log of the similarity function. Matches whose similarity are above t (0.5) are not penalized.

$$\text{Inverse weighting score}(x, y) = \begin{cases} \frac{1}{d(x, y)} & \text{if } d(x, y) < t(= 0.5) \\ 0 & \text{otherwise} \end{cases}$$

Inverse weighting function penalizes mismatches inversely proportional to their (dis)similarity. Matches whose similarity is above t (0.5) are not penalized.

Figure 9A:
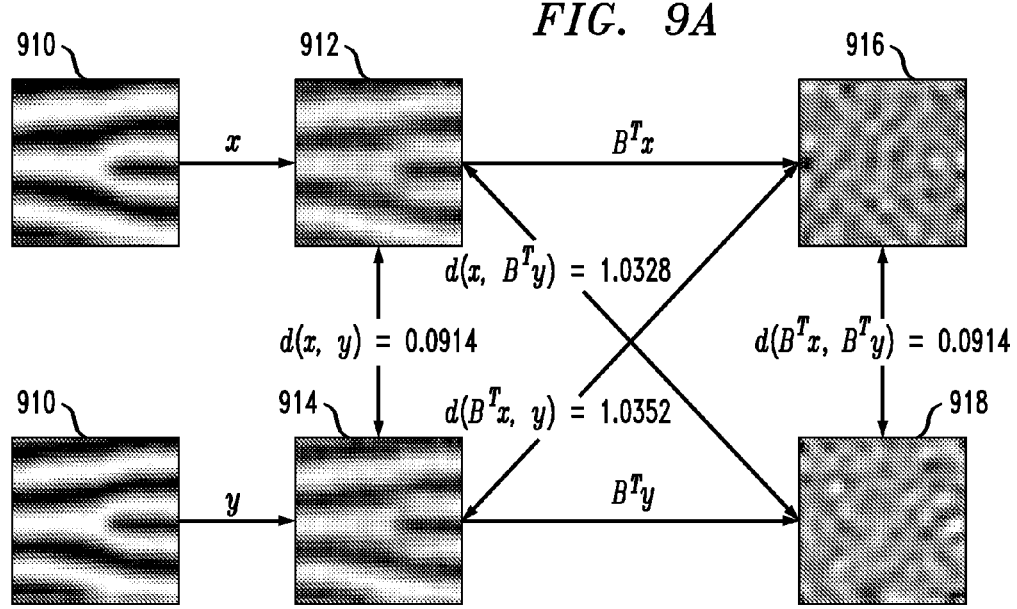
FIGS. 9A-C are diagrams illustrating the relationships between feature point coordinates of a fingerprint image and feature point coordinates of multiple distortions derived from the fingerprint image, according to an embodiment of the present invention.
Figure 9B:
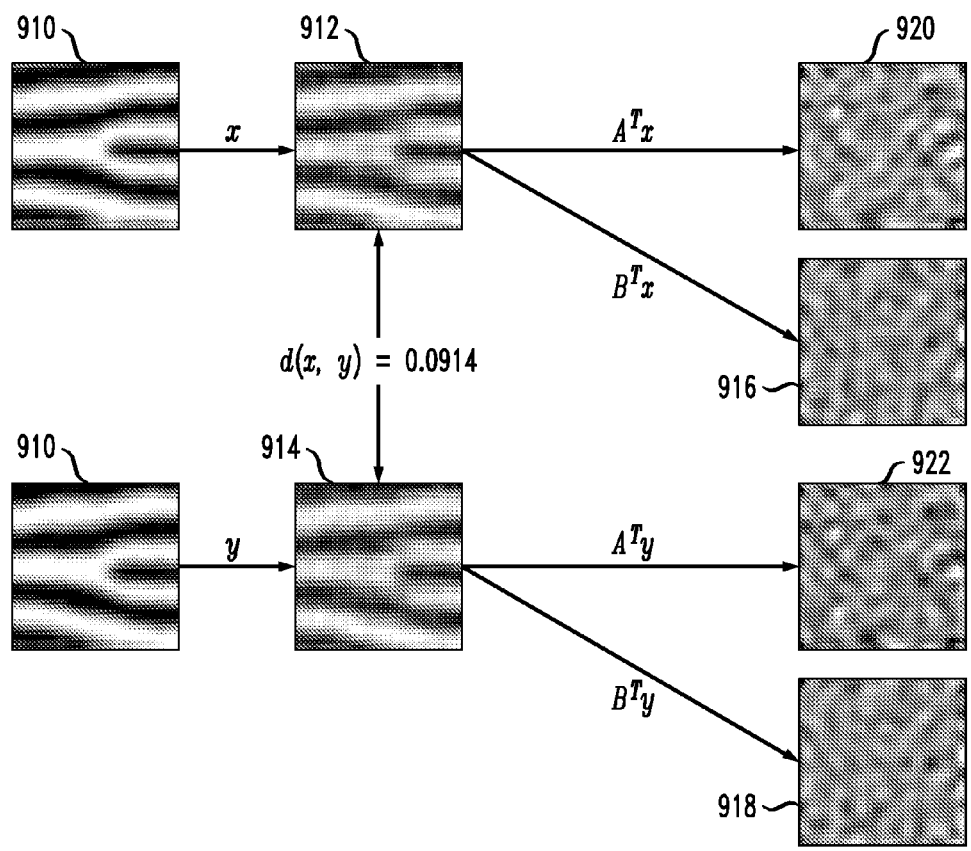
Figure 9C:
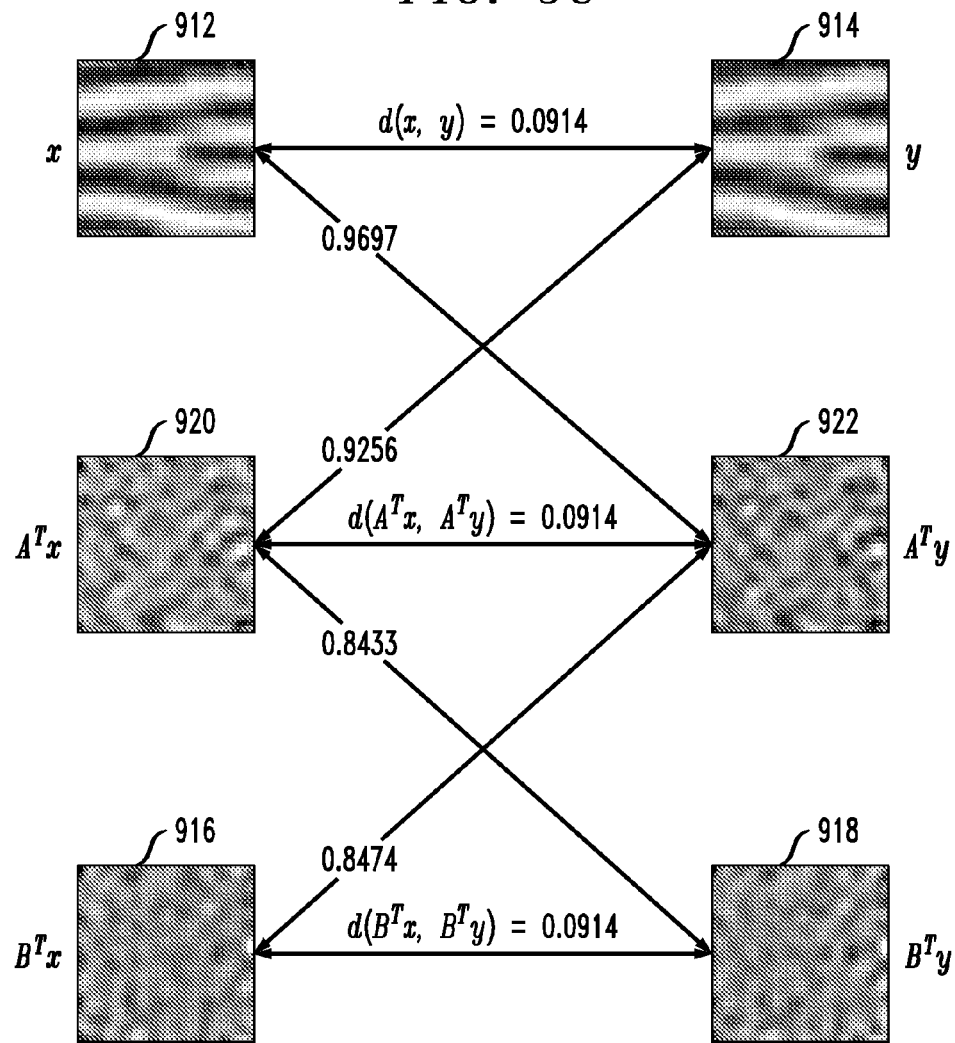

Referring now to FIGS. 9A-C, diagrams illustrate the relationships between feature point coordinates of a fingerprint image and feature point coordinates of multiple distortions derived from the fingerprint image, according to an embodiment of the present invention. Patch 910 is the image of an area around a feature point of a fingerprint. The patch is defined by its x coordinates 912 and y coordinates 914. FIG. 9A illustrates the distortion of the x coordinates and y coordinates using random projection $B^T$. Distortion $B^T$x is represented by patch 916 and distortion $B^T$y is represented by patch 918. The relationship between the original x and y coordinates are defined as a function d(x, y), which is 0.0914 for this example. By distorting the x coordinates with $B^T$, the relationship between $B^T$x and y, represented by d($B^T$x, y), is 1.0352 for this example. By distorting the y coordinates with $B^T$, the relationship between x and $B^T$Y, represented by d(x, $B^T$y), is 1.0328 for this example. However, the relationship between $B^T$x and $B^T$y, represented by d($B^T$x, $B^T$y), remains 0.0914, which is the same value as d(x, y). Therefore, the distortion maintains the same spatial relationships between feature points as the original fingerprint image.

As long as the distortion is unique, multiple distortions can be generated from the same fingerprint image. FIG. 9B shows patch 910 defined by its x coordinates 912 and y coordinates 914. Patches 912 and 914 are distorted by $A^T$ and $B^T$. Distortion $A^T$x is represented by patch 920, distortion $B^T$x is represented by patch 916, distortion $A^T$y is represented by patch 922, and distortion $B^T$y is represented by patch 918. FIG. 9C shows the coordinate relationships for each distortion with respect to the original patch image. Each distortion shows the same coordinate relationships as the original patch, d(x, y)=d ($A^T$x, $A^T$y)=d($B^T$x, $B^T$y).

Figure 10:
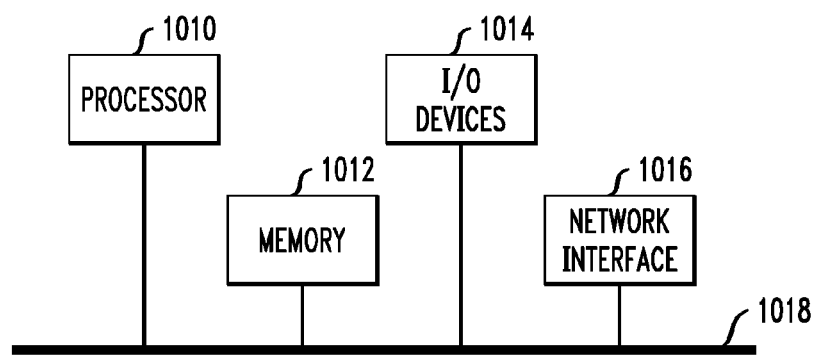
FIG. 10 is a diagram illustrating an illustrative hardware implementation of a computing system in accordance with which one or more components/methodologies of the present invention may be implemented, according to an embodiment of the present invention.

Referring now to FIG. 10, block diagram 1000 illustrates an exemplary hardware implementation of a computing system in accordance with which one or more components/methodologies of the invention (e.g., components/methodologies described in the context of FIGS. 1-9C) may be implemented, according to an embodiment of the present invention.

As shown, the techniques for generating a distorted template for a given fingerprint image may be implemented in accordance with a processor 1010, a memory 1012, I/O devices 1014, and a network interface 1016, coupled via a computer bus 1018 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for generating a distorted fingerprint representation for a given fingerprint image, comprising the steps of:
   selecting at least one fingerprint feature point from the given fingerprint image;
   generating at least one representation of a region proximate to the selected fingerprint feature point;
   using a distortion key to distort the representation of the region proximate to the selected fingerprint feature point, wherein the distortion key defines a random projection that is applied to the representation to distort the representation to generate a randomly projected representation of the region proximate to the selected fingerprint feature point;
   forming a distorted fingerprint template comprising the randomly projected representation of the region proximate to the selected fingerprint feature point, wherein the distorted fingerprint template is non-invertable such that the given fingerprint image cannot be obtained using the distorted fingerprint template and the distortion key; and
   storing the distorted fingerprint template in association with the distortion key;
   wherein one or more of the steps of selecting, generating, distorting and forming are performed by a computer.

2. The method of claim 1, wherein the step of generating the representation of a region proximate to the selected fingerprint feature point further comprises generating a set of transform coefficients representative of the region proximate to the selected fingerprint feature point.

3. The method of claim 2, wherein the set of transform coefficients comprises a set of Gabor expansion coefficients.

4. The method of claim 3, wherein a selected subset of the set of transform coefficients are used, wherein selection is random or based on a prior evaluated strategy.

5. The method of claim 3, wherein the set of transform coefficients are quantized.

6. The method of claim 2, wherein applying a random projection to the representation to generate a randomly projected representation of the region proximate to the selected fingerprint feature point further comprises randomly projecting at least a portion of the set of transform coefficients.

7. The method of claim 1, wherein the at least one fingerprint feature point is a minutia comprising at least one of a ridge ending and a bifurcation.

8. The method of claim 1, further comprising the step of computing a dominant direction associated with the region proximate to the selected fingerprint feature point.

9. The method of claim 8, further comprising the step of aligning the representation of said region to the computed dominant direction.

10. The method of claim 1, wherein the distortion key comprises a projection matrix.

11. The method of claim 10, wherein the projection matrix is split into two parts and the two parts are kept separately with one part of the two parts being with a user.

12. The method of claim 10, wherein the projection matrix comprises random orthonormal axes.

13. The method of claim 1, wherein the distorted fingerprint template is subsequently useable for an identity verification operation, wherein an identity verification process comprises:
   obtaining a fingerprint of an individual;
   processing the obtained fingerprint with the distortion key to generate a new distorted fingerprint template; and
   comparing the new distorted fingerprint template with the distorted fingerprint template stored in association with the distortion key to verify an identity of the individual.

14. An article of manufacture for generating a distorted fingerprint representation for a given fingerprint image, the article of manufacture comprising a computer readable storage medium containing one or more programs, which when executed by a computer implement the steps of claim 1.

15. A system for generating a distorted fingerprint representation for a given fingerprint image, comprising:
   a memory for storing program instructions for generating a distorted fingerprint template for a given fingerprint image; and
   a processor to execute the program instructions to instantiate:
   a feature locator for selecting at least one fingerprint feature point from the given fingerprint image;
   a feature summarizer for generating at least one representation of a region proximate to the selected fingerprint feature point;
   a distorter for using a distortion key to distort distorting the representation of the region proximate to the selected fingerprint feature point, wherein the distortion key defines a random projection that is applied to the representation to distort the representation to generate a randomly projected representation of the region proximate to the selected fingerprint feature point; and
   a distorted fingerprint template generator for forming a distorted fingerprint template comprising the randomly projected representation of the region proximate to the selected fingerprint feature point, wherein the distorted fingerprint template is non-invertable such that the given fingerprint image cannot be obtained using the distorted fingerprint template and the distortion key;
   wherein the distorted fingerprint template is stored in the memory in association with the distortion key.

16. The system of claim 15, wherein generation of the representation of a region proximate to the selected fingerprint feature point further comprises generating a set of transform coefficients representative of the region proximate to the selected fingerprint feature point.

17. Apparatus for generating a distorted fingerprint representation for a given fingerprint image, the apparatus comprising:
   a memory; and
   at least one processor coupled to the memory and operative to:

select at least one fingerprint feature point from the given fingerprint image;

generate at least one representation of a region proximate to the selected fingerprint feature point;

use a distortion key to distort the representation of the region proximate to the selected fingerprint feature point, wherein the distortion key defines a random projection that is applied to the representation to distort the representation to generate a randomly projected representation of the region proximate to the selected fingerprint feature point;

form a distorted fingerprint template comprising the randomly projected representation of the region proximate to the selected fingerprint feature point, wherein the distorted fingerprint template is non-invertable such that the given fingerprint image cannot be obtained using the distorted fingerprint template and the distortion key; and store the distorted fingerprint template in association with the distortion key.

* * * * *